United States Patent Office 3,642,887
Patented Feb. 15, 1972

3,642,887
PREPARATION OF AMINO-SUBSTITUTED
CARBOXYLIC ACIDS
Philip F. Jackisch, Livonia, Mich., assignor to Ethyl
Corporation, New York, N.Y.
No Drawing. Filed Dec. 19, 1966, Ser. No. 602,533
Int. Cl. C07c 101/20, 101/26
U.S. Cl. 260—534 E                                    4 Claims

ABSTRACT OF THE DISCLOSURE

Dimethyl sulfoxide catalyzes the reaction between α-halosubstituted carboxylic acids and nitrogen compounds selected from ammonia, primary, and secondary amines. For example, high yields of nitrilotriacetic acid are obtained when ammonia is reacted with chloroacetic acid in the presence of promoter quantities of dimethyl sulfoxide.

FIELD OF THE INVENTION

This invention relates to a method for the preparation of amino-substituted carboxylic acids. More specifically, it relates to the process of reacting α-halosubstituted carboxylic acids with a compound containing at least one N—H bond. In essence it relates to catalysis of this process with dimethyl sulfoxide. In the absence of diluting solvent, reactivity is enhanced, favoring complete substitution of the hydrogens bonded to amino nitrogen.

BACKGROUND OF THE INVENTION

Amino-substituted carboxylic acids are valuable compounds. Two compounds which illustrate the commercial importance of this class of acids are nitrilotriacetic acid and ethylenediamine tetraacetic acid. Salts of the nitrilo compound, for example, trisodium nitrilotriacetate, are useful in detergent compositions. Alkali metal salts of ethylenediamine tetraacetic acid are useful as chelating agents.

It is known in the art that these acidic compounds can be prepared by a process which uses hydrogen cyanide as a starting material; U.S. 2,855,428. This method has an inherent drawback, namely, the toxicity of HCN.

It is also known that nitrilotriacetate salts (and related compounds) can be produced by reaction of metal hydroxides with triethanolamine (or related alkanolamines); British Patents 601,816, 601,817. This method suffers from the need for an alkanolamine starting material and these appear to be comparatively expensive in many instances because of the amount of acid produced by methods known in the art.

Accordingly, a need exists for another method for the production of amino-substituted carboxylic acids. Although it has been known for a long time that α-halocarboxylic acids react with ammonia and amines, this reaction has not been very significant because of the low yields of desired product produced by this process. This invention affords a decided increase in yield, thereby making the reaction utilizing α-halocarboxylic acids much more attractive. Moreover, the process of this invention does not have the drawbacks inherent in the preparative routes based on hydrogen cyanide or alkanolamine.

SUMMARY OF THE INVENTION

In essence, the heart of this invention comprises the discovery that dimethyl sulfoxide (DMSO) will catalyze reactions such as (1) $4NH_3 + 3ClCH_2COOH \xrightarrow{DMSO} N(CH_2COOH)_3 + 3NH_4Cl$

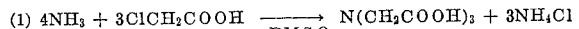
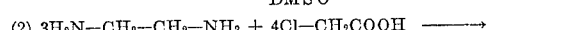

In Equation 2 above, EDTA is used to represent ethylenediamine tetraacetic acid and ED is used to depict ethylene diamine. Many of the compounds produced by the process of this invention are known and they have the many utilities known for them. As stated above, for example, the products of Equations 1 and 2 can be transformed into salts which respectively, are useful in detergent compositions and as chelating agents.

DESCRIPTION OF PREFERRED EMBODIMENTS

For use in the process of this invention, α-halocarboxylic acids having Formula I are preferred.

In this formula, X is preferably selected from chlorine and bromine, and R and R' are selected independently from hydrogen, chlorine, bromine, and organic radicals. More preferably, R and R' are selected from hydrogen and organic radicals. Preferred organic groups are hydrocarbyl radicals, that is, they are solely composed of carbon and hydrogen. The exact configuration of the hydrocarbon radicals is not critical, provided that they do not unduly retard the process of this invention by steric hindrance by the presence of a radical which is reactive under the process conditions employed, or by the presence of a group which causes a perturbation of the electronic arrangement in the C—X bond (to be reacted) in such a manner as to materially reduce the ability of said C—X bond to react in the manner desired.

Of the organic radicals of this type, those having up to about 6 carbon atoms are preferred. There is an critical limitation size, but the acids containing radicals of the aforementioned number of carbon atoms are (usually) less expensive and more readily available. Likewise, for these reasons, acids having not more than about 18 carbon atoms are preferred.

Of the radicals having the preferred size, alkyl, cycloalkyl, and phenyl radicals are preferred. Typical alkyl radicals are methyl, ethyl, butyl, hexyl, decyl, and tridecyl. Such radicals having three or more carbon atoms may have straight or branched chains. Exemplary cycloalkyl radicals are cyclohexyl and cyclopentyl. These radicals may be substituted with other groups about the ring. Phenyl and naphthyl are illustrative aryl radicals. Alkaryl radicals derived from toluene, the xylenes, the various tri- and tetramethyl substituted benzenes, as well as the corresponding pentamethyl substituted compound, are applicable. Similarly, such radicals as those derived from isopropylbenzene, tert-butylbenzene, and heptylbenzene can appear in acids useful in this process. Likewise, typical aralkyl radicals are benzyl, phenylethyl, 2-[benzyl]-hexyl, and the like. It is to be understood that the various specific radicals named above are illustrative and non-limiting.

Turning now to the amine-type reactants used in this process, there are two distinct classes. The first is the inorganic compound, ammonia. The second comprises the primary and secondary amines having the formulas:

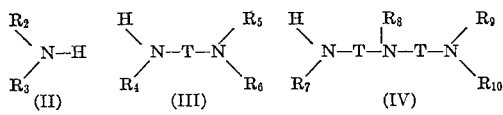

In Formula II, $R_2$ and $R_3$ are selected from hydrogen and organic radicals such that at least one of them is an organic radical. In Formulas III and IV, $R_4$–$R_{10}$ are independently selected from hydrogen and organic radicals. (Preferably, $R_4$–$R_{10}$ are all hydrogen atoms.) The radical indicated by T (in Formulas III and IV) is an alkylene radical of 2 to 6 carbons. Preferably, T is a straight chain radical, but compounds having branched chain "T's" are also applicable. Most preferably, the alkylene radicals, T, is solely composed of carbon and hydrogen.

As to the configuration of the organic radicals illustrated by $R_2$–$R_{10}$, it is only necessary that they do not unduly retard the reaction. As to size of the applicable radicals, there is no critical limitation. However, since amines of less than about 18 carbon atoms and containing organic radicals of less than about 6 carbons are usually readily available, and are preferred. Typical examples of applicable preferred radicals are named above when discussing the applicable acids.

When conducting the process of this invention, it is not necessary to use any specific molar ratio of acid to amine-type reactant. In other words, stoichiometric amounts, as well as an excess of either reactant, can be employed, However, it will be recognized by a skilled practitioner that a particular desired result may suggest a relative quantity of reactants. For example, if an amine having more than one replaceable hydrogen is to be reacted, and it is desired that less than all hydrogens be replaced, then it may be desirable to use an excess of amine. On the other hand, if one wishes to replace all amino hydrogens and assist driving the reaction to completion, an excess of acid is suggested.

There is no real limit on the amount of excess of reactant amine or acid which can be employed. Considerations which define a practical upper limit are size of reaction vessel, economics, etc. Usually it is not desirable to use an excess of more than 10 moles, for larger amounts may complicate removal of the product from the resultant reaction mixture.

Promoter quantities of DMSO are used. In most instances, solvent quantities of DMSO are adequate. Although there is no real upper limit on the amount of DMSO employed, it is usually desired that from about one to about 100 moles of DSMO are used for each mole of α-halosubtituted carboxylic acid.

The reaction temperature is not critical and any temperature which affords an acceptable rate of reaction and which does not decompose the reactants or products can be employed. Generally, temperatures within the range of from 20° to 189° C. are satisfactory. A preferred range is from about 20° to about 100° C.

The reaction pressure is not critical. Ambient pressure as well as superatmospheric and subatmospheric pressure can be used if desired. When using a gaseous amine such as ammonia or methylamine, superatmospheric pressures up to about 1000 p.s.i.g. may be advantageous to facilitate contacting the reactants.

The reaction time is not a truly independent variable for it depends to same extent on the reactivity of reactants, temperature, etc. Usually, reaction times are inversely proportional to temperature. In general, reaction times of up to 5 days are sufficient.

Although it is not necessary to do so, this process can be conducted in the presence of inert solvents or gases.

Typical solvents which can be employed (in conjunction with DMSO) are benzene or diethyl ethers. Similar aromatic compounds and ethers can also be used.

The process is readily carried out by merely contacting promoter quantities of DMSO with the reactants in a reaction zone. Liquid phase reactions are preferred. In many instances, agitation of the reaction mixture by stirring or rocking facilitates the reaction and decreases the reaction times.

The product is isolated from the resultant reaction mixture by means apparent to one skilled in the art. Distillation, crystallization, chromatography and electrophoresis are examples of suitable techniques.

The following examples illustrate the process of this invention but do not limit it. Unless otherwise noted, all parts are by weight.

EXAMPLE 1

To a suitable reaction vessel was charged 10 parts of chloroacetic acid and 165 parts of dimethylsulfoxide. Ammonia gas (dried with a soda-lime tower) mixed with nitrogen was bubbled slowly into the DMSO solution (stirred at room temperature) for three days. A solid precipitate formed.

The solid was recovered by filtration, washed with diethyl ether and then dissolved in hot water.

Upon acidification and cooling a solid crystallized. The solid was collected by filtration, washed with a small amount of water, and air-dried. Analysis indicated that the solid was 97.4 percent pure nitrilotriacetic acid and that an 85.7 percent yield of this product was obtained.

EXAMPLES 2–8

All examples in the following table are conducted in the presence of DMSO (100 moles per mole of acid).

| Example | Reactant | Reactant | Temperature, °C. | Pressure | Mole acid per mole amine | Product |
|---|---|---|---|---|---|---|
| 2 | α-Chloropentadecanoic acid | Ammonia | 100 | 1,000 p.s.i.g. | 3/4 | $N[CH(C_{11}H_{23})-COOH]_3$ |
| 3 | α-Chlorophenylacetic acid | Dipentadecylamine | 100 | Atmosphere [1] | 1/2 | $(C_{15}H_{31})_2N-CH(C_6H_5)-COOH$ |
| 4 | Chloroacetic acid | Ethylenediamine | 80 | do | 4/3 | Ethylenediamine tetraacetic acid. |
| 5 | Bromoacetic acid | Diethylenetriamine | 80 | do | 5/3 | Diethylene triamine pentaacetic acid. |
| 6 | Chloroacetic acid | Aniline | 25 | do | 2/3 | $C_6H_5-N-(CH_2-COOH)_2$ |
| 7 | α-Chlorocyclohexyl acetic acid | Benzylamine | 40 | do | 1/8 | $(C_6H_{11})[(C_6H_5)-CH_2-NH]-CH-COOH$ |
| 8 | Chloroacetic acid | Ammonia | 20 | do | 1/20 | Glycine. [2] |

[1] 1 Atmosphere.  [2] Reaction carried out in the presence of equal volumes of benzene and DMSO.

Typical detergent formulations using salts of nitrilo-acetic acid and ethylenediamine tetraacetic acid are described and referred to in Chem. Abstracts, 65, 10813b, 1966, and Chem. Abstracts, 65, 10812f, 1966.

Having fully described the process of this invention, its utilities, and the utilities of the compounds produced thereby, it is desired that this invention be solely limited by the lawful scope of the appended claims.

I claim:

1. In a process for the preparation of nitrilotriacetic acid from ammonia and a monohaloacetic acid, the improvement which consists essentially of:
    reacting about four moles of ammonia and about three moles of chloroacetic acid in the presence of from about one to about 100 moles of dimethyl sulfoxide per each mole of said chloroacetic acid at a temperature of from about 20° to about 189° C.

2. The process of claim 1 being conducted at a temperature within the range of from about 20° to about 100° C.

3. The process of claim 1 being conducted at ambient temperature.

4. The process of claim 1 wherein aqueous ammonia is bubbled into a mixture of chloroacetic acid and dimethyl sulfoxide.

References Cited

UNITED STATES PATENTS 2,239,617   4/1941   Moore _____ 260—534

OTHER REFERENCES

Kharasch et al., Quarterly Reports on Sulfur Chemistry, vol. 1, March 1966.

JAMES A. PATTEN, Primary Examiner

J. L. DAVISON, Assistant Examiner

U.S. Cl. X.R.

260—404, 404.5, 514 R, 518 R